US006244984B1

(12) United States Patent
Dieterich

(10) Patent No.: US 6,244,984 B1
(45) Date of Patent: Jun. 12, 2001

(54) SWITCH GEAR WITH AT LEAST TWO GEAR STAGES

(75) Inventor: Günter Dieterich, Kamen (DE)

(73) Assignee: Stromag AG, Unna (DE)

(*) Notice: Subject to any disclaimer, the term of this patent is extended or adjusted under 35 U.S.C. 154(b) by 0 days.

(21) Appl. No.: 09/427,172

(22) Filed: Oct. 25, 1999

(30) Foreign Application Priority Data

Nov. 4, 1998 (EP) .................................................. 98120923

(51) Int. Cl.[7] ............................... F16H 3/74; F16H 57/08

(52) U.S. Cl. ........................... 475/263; 475/340; 192/139

(58) Field of Search ..................................... 475/263, 125, 475/126, 340, 338; 192/139

(56) References Cited

U.S. PATENT DOCUMENTS

| | | | | |
|---|---|---|---|---|
| 3,036,167 | | 5/1962 | Bacchi | 200/38 |
| 4,616,528 | * | 10/1986 | Malinski et al. | 192/150 X |
| 4,742,730 | * | 5/1988 | Dorn et al. | 475/332 |
| 4,869,139 | * | 9/1989 | Gotman | 475/263 |
| 5,104,360 | * | 4/1992 | Wientke et al. | 474/152 |
| 5,779,587 | * | 7/1998 | Reilly | 475/263 |
| 5,800,305 | * | 9/1998 | Ra | 475/343 |

FOREIGN PATENT DOCUMENTS

| | | | |
|---|---|---|---|
| 0 355 731 B1 | 2/1990 | (EP) | H01H/3/40 |
| 0 684 452 A2 | 11/1995 | (EP) | G01D/3/028 |

* cited by examiner

*Primary Examiner*—Charles A. Marmor
*Assistant Examiner*—Ha Ho
(74) *Attorney, Agent, or Firm*—Thelen Reid & Priest LLP; David B. Ritchie

(57) ABSTRACT

A switch gear with at least two gear stages is provided. At least one gear stage is configured as a switching stage, whereby at least one switching stage is formed by a coaxially nonrotatable sunwheel on a drive shaft, by at least one planet carrier carrying one planet wheel and by at least one ring gear meshing with the planet wheel on the inside, which is held fixed in its housing, and by a cam disk for the actuation of switching elements. The cam disk is provided with a female spline which exhibits approximately the identical pitch circle diameter as the female spline of the ring gear, whereby the female spline of the cam disk exhibits a number of teeth different from the female spline of the ring gear and whereby the cam disk, by means of the female spline, meshes with at least one planet wheel of the switching stage. The switch gear may be used, for example, as a limit switch of cranes.

8 Claims, 2 Drawing Sheets

SWITCH GEAR WITH AT LEAST TWO GEAR STAGES

CROSS REFERENCE TO A FOREIGN APPLICATION

This application claims priority benefit under 35 U.S.C. §119 of European Patent Office application number 98120923.2 entitled "Schaltergetriebe mit wenigstens zwei Getriebestufen" filed on Nov. 4, 1998.

1. Field of the Invention

The invention relates to a switch gear with at least one switching stage formed by a sunwheel which is driven by one planet carrier carrying at least one planet wheel and by a ring gear coaxially disposed with respect to the sunwheel and meshing on the inside with at least one planet wheel, held fixed in its housing, and whereby the switching stage exhibits a cam disk for the actuation of switching elements.

2. Background of the Invention

A switch gear similar in some respects to that of the present invention is known to the art from European Patent 0 355 731 B1 entitled "Vorrichtung zur Betätigung von Schaltelementen" and published Dec. 28,1994 in the form of a limit switch. The limit switch is composed of two gear parts, whereby the first gear part is formed by two gear stages serving as reduction stages. The second gear part is formed by all together four switching stages. The gear parts are constructed as planetary gears. At the same time, a cam disk is respectively provided in each switching stage, which serves for actuation of a corresponding switching element. Each cam disk is held on a planet carrier which additionally carries planet wheels which, in each case, mesh with a clutch wheel serving as a sunwheel and with a female spline of a ring gear fixed on the housing. By means of the reductions respectively achieved it is possible, by means of a drive motor, to control corresponding switching elements, in particular for motion control of cranes or for other devices or machines, via the cam disk.

It would be desirable to create a switch gear of the kind described above which, having the same size, enables further improved reduction ratios.

SUMMARY OF THE INVENTION

The cam disk of a switch gear is provided with a female spline which exhibits approximately the identical pitch circle diameter as the female spline of a corresponding ring gear, whereby the female spline of the cam disk exhibits a number of teeth different from the female spline of the ring gear and whereby the cam disk, by means of the female spline, meshes with at least one planet wheel of a switching stage. A multiplication of the reduction in at least one switching stage results, such that in every gear stage with identical dimensions, a substantially greater reduction can be accommodated. At the same time, it is possible, through corresponding identical dimensions, to integrate the switching stage in the identical pitch dimension as exhibited by switching stages in accordance with the prior art. This is particularly suitable for limit switches which, in the reduction stages, are constructed in accordance with the limit switches described in EP 0 355 731 B1. The planetary gears of the different switching stages of the limit switch of EP 0 355 731 B1 can, in each case, be replaced by a differential toothed gearwheel in order to achieve substantially greater reductions.

Another aspect of the invention, the number of teeth of the female spline of the cam disk is greater than the number of teeth of the female spline of the ring gear, thereby resulting in a particularly advantageous increased reduction ratio.

In another aspect of the invention, where the number of teeth of the female spline of the ring gear is 46 and the number of teeth of the sunwheel is 14, the number of teeth of the female spline of the cam disk is 49. In this embodiment, a limit switch with identical dimensions to those exhibited by the prior art exhibits a reduction ratio of 69.98 per gear stage.

Yet another aspect of the invention, a worm gear meshing with a male spline of the ring gear is provided for adjustment of the cam disk, whose reduction ratio is adjusted to the difference in the number of teeth of the cam disk to the ring gear. It is thereby possible to provide the same cam disk adjustment as with EP 0 355 731 B1, whereby the refinement in accordance with the invention is adapted to the correspondingly increased reduction of the cam disk.

DETAILED DESCRIPTION OF THE PREFERRED EMBODIMENTS

Those of ordinary skill in the art will realize that the following description of the present invention is illustrative only, and not intended to be in any way limiting. Other embodiments of the invention will readily suggest themselves to such skilled persons having the benefit of this disclosure.

Figure 1:
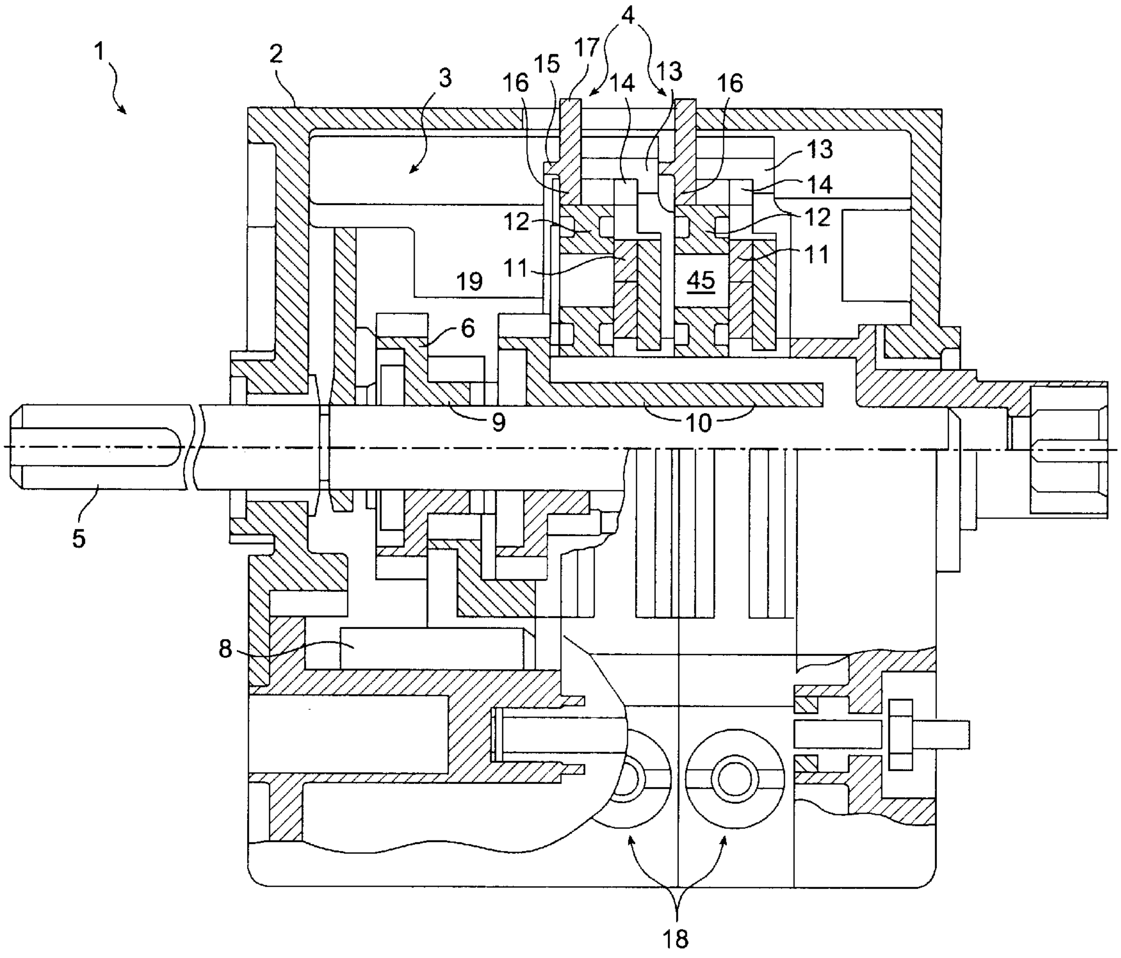
FIG. 1 shows in a broken-out section a refinement of a switch gear in the form of a limit switch, FIG. 2 in a sectional representation a cam disk of the limit switch according to FIG. 1, and FIG. 3 a front view of the cam disk according to FIG. 2.
Figure 2:
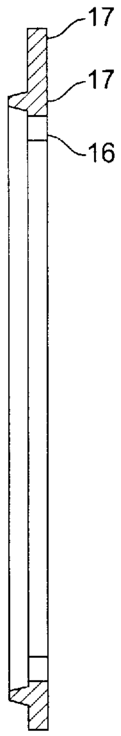
Figure 3:
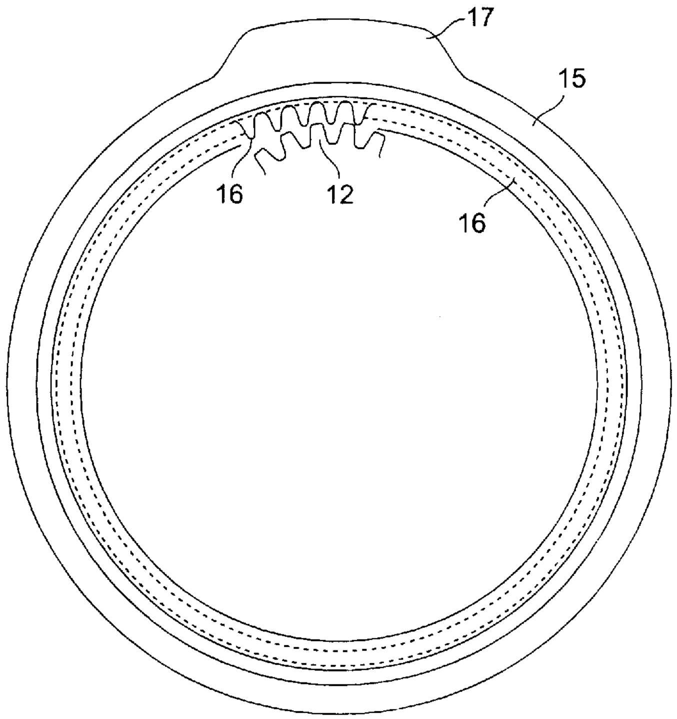

A switch gear in the form of a limit switch 1 for the mechanical actuation of switching elements (not shown) exhibits, in accordance with FIG. 1, a housing 2 in which two gear parts 3, 4 are accommodated. The first gear part 3 is formed by a reduction stage and the second gear part 4 by two switching stages. The first gear part 3 is constructed in accordance with a presently preferred embodiment according to FIG. 10 of EP 0 355 731 B1, such that for a more detailed explanation reference is additionally made to EP 0 355 731 B1. The first gear part 3 is driven by a drive shaft 5 connected to a drive unit (not shown). The drive unit is part of a functional unit, like a crane in particular, which is intended to execute precisely controlled movements. To this end, switching elements (not shown) are provided for the control of corresponding movements, which, in the manner described below, are actuated by the switching stages of the second gear part 4. The first gear part 3 represents a preliminary reduction in the form of a spur wheel pre-stage which is intended to reduce great surges in the reductions of the planet stages. This preliminary reduction is not required. An introduction of force can also result directly to the sunwheel 9 from the drive shaft 5.

The first gear part 3 exhibits a drive wheel 6, provided with a stepped male spline, nonrotatably mounted on the drive shaft 5. The drive wheel 6 meshes by means of its male splining with the male splining of a toothed gearwheel 7 mounted eccentrically on an axle 8 which is axis-parallel to the drive shaft 5 which likewise is provided with a bipartite, stepped male spline. The axle 8 for mounting of the toothed gearwheel 7 is fixed to the housing 2. The male spline of the toothed gearwheel 7 with a smaller diameter meshes with the male spline of a sunwheel 9 coaxially, rotatably mounted on the drive shaft 5. The sunwheel 9 is rotationally connected to two coaxially attaching clutch wheels 10 which are likewise rotationally connected to each other and rotatably mounted on the drive shaft 5. The sunwheel 9 exhibits a second, axially displaced male spline with a smaller diameter with respect to the male spline meshing with the toothed gearwheel 7. Both clutch wheels 10 are provided with correspondingly identical male splines. In each case, three planet wheels 12 mounted at intervals over the circumference of the sunwheel 9 and clutch wheels 10 mesh with the male spline formed by the sunwheel 9 and the clutch wheels 10 serving as a common sunwheel, which, per switching stage, are respectively held on a common planet carrier 11. The planet carrier 11 of each switching stage 4 bears glide-motionally against a ring gear 13 coaxial to the drive shaft 5 which with a female spline 14 meshes with the respective planet wheels 12. Both ring gears 13 are held in each case fixed in the housing 2 by means of a male spline not characterized in greater detail. Both ring gears 13 are respectively adjustably held in the circumferential direction on the housing 2. In each case an adjustment worm 18 is provided for this purpose. The adjustment of the ring gears 13 corresponds in construction and function to the adjustment of the ring gears of the switching stages of the limit switch according to EP 0 355 731 B1, such that, for supplementary explanation of the construction and function of the adjusting worms 18, reference is made to EP 0 355 731 B1. The only difference of the adjustment worm 18 serving as worm gear for the adjustment of the ring gears 13 is that the corresponding reduction ratio of each adjustment worm 18 is adapted to the reduction of the respective cam disk 15 modified from the prior art represented by EP 0 355 731 B1.

In each case, a cam disk 15 is respectively allocated to each switching stage 4, which, in contrast to EP 0 355 731 B1, is not held on the respective planet carrier but which, rather, in each case meshes by means of a female spline 16 with the respective planet wheels 12 of each switching stage 4. The female spline 16 exhibits the identical pitch circle diameter as the female spline 14 of the adjacent ring gear 13. The number of teeth of the female spline 16 of each cam disk 15 is, however, different from the number of teeth of the female spline 14 of the respective ring gear 13. In the example embodiment shown, the female spline 16 of each cam disk 15 exhibits a greater number of teeth vis-à-vis the number of teeth of the female spline 14 of the respective ring gear 13. The female spline 16 of each cam disk 15 exhibits, for example, forty-nine teeth. The female spline 14 of each ring gear 13, in contrast, exhibits forty-six teeth in the same example. The number of teeth of the male spline of the sunwheel 9 and clutch wheels 10 meshing with the planet wheels 12, which—as stated above—functionally form a common sunwheel, is fourteen. Both cam disks 15 in each case are axially, glide-motionally held. At the same time the cam disk 15 of the first switching stage 4 bears, on the one hand, on a thin support disk 19 mounted between the sunwheel 9 and the planet wheels 12 and with its outer edge axially supports the female spline 16 of the cam disk 15. The cam disk 15 of the second switching stage 4 bears axially, glide-motionally with a ring not characterized in greater detail on the ring gear 13 of the first switching stage 4 and with its opposing front surface on the ring gear 13 of the second switching stage 4.

Each cam disk 15 exhibits a switching cam 17 projecting radially outward through a corresponding recess in the housing 2 which is provided for the actuation of the respective switching element. By providing each cam disk 15 with a female spline 16, whose number of teeth is greater than the number of teeth of the female spline 14 of the ring gear 13 allocated and the simultaneous meshing of the cam disk 15 with the respective planet wheels 12, a differential tooth gear is created for each switching stage 4 which, in comparison with the prior art of EP 0 355 731 B1, achieves a multiplied reduction ratio. With the tooth numbers described, a reduction of 69.98 from clutch wheels 10 to cam disk 15 results for the present exemplary embodiment. Despite the substantially greater reduction, vis-à-vis EP 0 355 731 B1, no larger construction space is required for the switching stages 4. With identical dimensions of the cam disks 15, it is possible with the cam disks of the switching stages in accordance with EP 0 355 731 B1 to accommodate the switching stages 4 of the second gear part in the same pitch dimension, as was the case for the switching stages of EP 0 355 731 B1.

As the shaft 5 rotates in a first direction (e.g., clockwise), sunwheel 9 and clutch wheel 10 turn in the first direction. The male spline of the clutch wheel 10 (or sunwheel 9) meshes with the inward facing male splines of planet wheels 12. The outward facing male splines of the planet wheels 12 mesh with the female spline 14 of the ring gear 13 and the female spline 16 of the cam disk 15. Rotation of the clutch wheel 10 causes the planet wheels 12 to rotate in a second direction opposite to the first (e.g., counterclockwise) on their respective axes secured to the planet carrier 11. Simultaneously, the planet wheels 12 also revolve around the clutch wheel 10 in the first direction. The planet wheels 12 are centripetally held against the clutch wheel 10 by a ring wheel 13, which is stationary relative to the housing 2. The cam disk 15, having a slightly greater number of gear teeth in its female spline 16 than the female spline 14 of the ring gear 13, also rotates in the first direction, albeit at a much slower rate than the clutch wheel 10. As the cam disk 15 rotates, the cam 17 moves angularly so as to actuate a switch being approached from the first direction.

The provision of a differential tooth gear, as provided in accordance with the invention and described in detail above, can of course be used in limit switches according to other refinements of the invention which exhibit known switching stages with the help of planetary gears, as they are known to the art from EP 0 355 731 B1. Consequently, depending on the switching operations desired, differential gears and planetary gears can be combined with one another in corresponding switching stages such that greatly varying reductions can result for different cam disks.

While embodiments and applications of this invention have been shown and described, it would be apparent to those skilled in the art having the benefit of this disclosure that many more modifications than mentioned are possible without departing from the inventive concepts therein. The invention, therefore, is not to be restricted except in the spirit of the appended claims.

What is claimed is:

1. A switch gear, comprising:

at least one switching stage in a housing, said at least one switching stage having a sunwheel, a planet carrier having at least one planet wheel, a ring gear and a cam disk, said sunwheel having a male spline, said at least one planet wheel having a male spline, said male spline of said sunwheel meshing with said male spline of said at least one planet wheel, said ring gear coaxially disposed with respect to said sunwheel, said ring gear having a female spline, said female spline of said ring gear exhibiting a first number of teeth and meshing with said male spline of at least one planet wheel, said ring gear held fixed in said housing; said cam disk having a cam for actuating a switching element, said cam disk having a female spline having approximately an identical pitch circle diameter as said female spline of said ring gear, said female spline of said cam disk exhibiting a second number of teeth different from said first number of teeth exhibited by said female spline of said ring gear, said female spline of said cam disk meshing with said male spline of said at least one planet wheel.

2. A switch gear in accordance with claim 1, wherein said second number of teeth of said female spline of said cam disk is greater than said first number of teeth of teeth of said female spline of said ring gear.

3. A switch gear in accordance with claim 2, wherein said first number of teeth of said female spline of said ring gear is 46, and said second number of teeth of said female spline of said cam disk is 49.

4. A switch gear in accordance with claim 3, wherein a third number of teeth of said sunwheel is 14.

5. A switch gear in accordance with claim 1, wherein further comprising:

a worm gear meshing with a male spline of said ring gear, said worm gear provided for adjustment of said cam disk, a reduction ratio of which is adjusted to a difference in number of teeth between said cam disk and said ring gear.

6. A switch gear in accordance with claim 2, wherein further comprising:

a worm gear meshing with a male spline of said ring gear, said worm gear provided for adjustment of said cam disk, a reduction ratio of which is adjusted to a difference in number of teeth between said cam disk and said ring gear.

7. A switch gear in accordance with claim 3, wherein further comprising:

a worm gear meshing with a male spline of said ring gear, said worm gear provided for adjustment of said cam disk, a reduction ratio of which is adjusted to a difference in number of teeth between said cam disk and said ring gear.

8. A switch gear in accordance with claim 4, wherein further comprising:

a worm gear meshing with a male spline of said ring gear, said worm gear provided for adjustment of said cam disk, a reduction ratio of which is adjusted to a difference in number of teeth between said cam disk and said ring gear.

* * * * *